US010556597B2

(12) United States Patent
Yamashita et al.

(10) Patent No.: US 10,556,597 B2
(45) Date of Patent: Feb. 11, 2020

(54) OPERATION INFORMATION MANAGEMENT DEVICE, OPERATION INFORMATION MANAGEMENT METHOD, AND OPERATION INFORMATION MANAGEMENT SYSTEM

(71) Applicant: ISUZU MOTORS LIMITED, Shinagawa-ku, Tokyo (JP)

(72) Inventors: Akira Yamashita, Kawasaki (JP); Keisuke Kimura, Kawasaki (JP)

(73) Assignee: ISUZU MOTORS LIMITED, Shinagawa-Ku, Tokyo (JP)

( * ) Notice: Subject to any disclaimer, the term of this patent is extended or adjusted under 35 U.S.C. 154(b) by 0 days.

(21) Appl. No.: 16/059,883

(22) Filed: Aug. 9, 2018

(65) Prior Publication Data
US 2019/0047576 A1    Feb. 14, 2019

(30) Foreign Application Priority Data
Aug. 10, 2017    (JP) .................................. 2017-154948

(51) Int. Cl.
*B60W 40/09* (2012.01)
*G07C 5/08* (2006.01)
(Continued)

(52) U.S. Cl.
CPC ............ *B60W 40/09* (2013.01); *B60W 50/14* (2013.01); *G06Q 10/06398* (2013.01);
(Continued)

(58) Field of Classification Search
CPC ........... B60W 2050/146; B60W 40/09; B60W 50/14; G06Q 10/06398; G06Q 50/30
See application file for complete search history.

(56) References Cited

U.S. PATENT DOCUMENTS

| 2004/0078133 A1* | 4/2004 | Miller ................ B60K 31/0008 |
| | | 701/96 |
| 2012/0143484 A1* | 6/2012 | Sawada ..................... B60L 3/12 |
| | | 701/123 |

(Continued)

FOREIGN PATENT DOCUMENTS

JP    2013-190886 A    9/2013

OTHER PUBLICATIONS

"Isuzu carries out full model change of commercial vehicle telematics "MIMAMORI"", Published May 8, 2017, English language machine translation provided; URL: http://www.isuzu.co.jp/press/2017/5_8prs.html.; 6 pages.

*Primary Examiner* — Omeed Alizada
(74) *Attorney, Agent, or Firm* — Procopio, Cory, Hargreaves & Savitch LLP

(57) ABSTRACT

An operation information management device including: an acquiring unit configured to acquire operation information items of each of a plurality of vehicles; an evaluating unit configured to make evaluations of drivers respectively associated with each of the plurality of vehicles, the evaluations being made based on the operation information items; a determining unit configured to determine a ranking of one or more of the drivers associated with each of one or more vehicles of the plurality of vehicles which are classified into the same type of vehicle, the determining of the ranking being performed based on the evaluations of the one or more drivers; and a display control unit configured to control a display unit such that the display unit displays the ranking of the one or more drivers determined by the determining unit.

13 Claims, 5 Drawing Sheets

(51) Int. Cl.
*G07C 5/00* (2006.01)
*G06Q 10/06* (2012.01)
*G06Q 50/30* (2012.01)
*B60W 50/14* (2012.01)

(52) U.S. Cl.
CPC ............ *G06Q 50/30* (2013.01); *G07C 5/008* (2013.01); *G07C 5/085* (2013.01); *B60W 2050/146* (2013.01)

(56) References Cited

U.S. PATENT DOCUMENTS

2013/0231854 A1* 9/2013 Rovik ................ B60R 16/0236 701/123
2016/0282124 A1* 9/2016 Chowdhury ......... G07C 5/0816
2017/0024393 A1* 1/2017 Choksi .................. G06Q 40/12

* cited by examiner

OPERATION INFORMATION MANAGEMENT DEVICE, OPERATION INFORMATION MANAGEMENT METHOD, AND OPERATION INFORMATION MANAGEMENT SYSTEM

STATEMENT REGARDING PRIOR DISCLOSURES BY THE INVENTORS

The inventors of the present application authored and disclosed the subject matter of the present application on May 8, 2017. The prior disclosures have been submitted in an Information Disclosure Statement in the present application as "Isuzu carries out full model change of commercial vehicle telematics "MIMAMORI"" (Published May 8, 2017; retrieved on Jul. 25, 2018; English language machine translation provided); URL: http://www.isuzu.co.jp/press/2017/5_8prs.html."

CROSS-REFERENCE TO RELATED APPLICATIONS

This application claims priority from Japanese Patent Application No. 2017-154948 filed on Aug. 10, 2017, the entire contents of which are incorporated herein by reference.

TECHNICAL FIELD

The disclosure relates to an operation information management device, an operation information management method, and an operation information management system for managing operation information of vehicles.

BACKGROUND

Digital tachographs for recording vehicle driving states are used mainly in the transport industry for various purposes, for example, to perform operation management for individual drivers or to give safety guidance. JP-A-2013-190886 discloses a technology for analyzing vehicle data acquired by digital tachographs and evaluating the driving contents in terms of safety, fuel efficiency, and so on, such that drivers can look back on their driving contents and drive more safely and economically.

The technology disclosed in JP-A-2013-190886 evaluates the driving contents of drivers, regardless of the types of vehicles which the drivers have operated. In the case where drivers have driven different types of vehicles, if their driving contents are evaluated in the same way, it is difficult to correctly compare evaluations of the drivers, which sometimes discourages the drivers from improving their driving skills.

SUMMARY

The disclosure was made in view of those points, and an object of the disclosure is to provide a technology for encouraging drivers to improve their driving skills.

According to an aspect of the disclosure, there is provided an operation information management device including: an acquiring unit configured to acquire operation information items of each of a plurality of vehicles; an evaluating unit configured to make evaluations of drivers respectively associated with each of the plurality of vehicles, the evaluations being made based on the operation information items; a determining unit configured to determine a ranking of one or more of the drivers associated with each of one or more vehicles of the plurality of vehicles which are classified into the same type of vehicle, the determining of the ranking being performed based on the evaluations of the one or more drivers; and a display control unit configured to control a display unit such that the display unit displays the ranking of the one or more drivers determined by the determining unit.

According to another aspect of the disclosure, there is provided an operation information management method for a computer, the method including: acquiring operation information items of each of a plurality of vehicles; making evaluations of drivers respectively associated with each of the plurality of vehicles, the evaluations being made based on the operation information items; determining a ranking of one or more of the drivers associated with each of one or more vehicles of the plurality of vehicles which are classified into the same type of vehicle, the determining of the ranking being performed based on the evaluations of the one or more drivers; and controlling a display unit such that the display unit displays the ranking of the one or more drivers.

According to another aspect of the disclosure, there is provided an operation information management system including: one or more operation information recording devices configured to record an operation information item of a vehicle; an operation information management device configured to manage a plurality of operation information items of a plurality of vehicles; and a user terminal, wherein the one or more operation information recording devices include: a recording unit configured to record the operation information item of the vehicle equipped with the operation information recording device; and a transmitting unit configured to transmit the recorded operation information item to the operation information management device, wherein the operation information management device includes: an acquiring unit configured to acquire the plurality of operation information items of the plurality of vehicles; an evaluating unit configured to make evaluations of drivers respectively associated with each of the plurality of vehicles, the evaluations being made based on the operation information items; a determining unit configured to determine a ranking of one or more of the drivers associated with each of one or more vehicles of the plurality of vehicles which are classified into the same type of vehicle, the determining of the ranking being performed based on the evaluations of the one or more drivers; and a transmitting unit configured to transmit the ranking of the one or more drivers determined by the determining unit to the user terminal, and wherein the user terminal includes: a receiving unit configured to receive the ranking of the drivers; and a display unit configured to display the received ranking of the drivers.

According to the disclosure, it is possible to obtain the effect of encouraging drivers to improve their driving skills.

DETAILED DESCRIPTION

<Outline of Embodiment>

Figure 1:
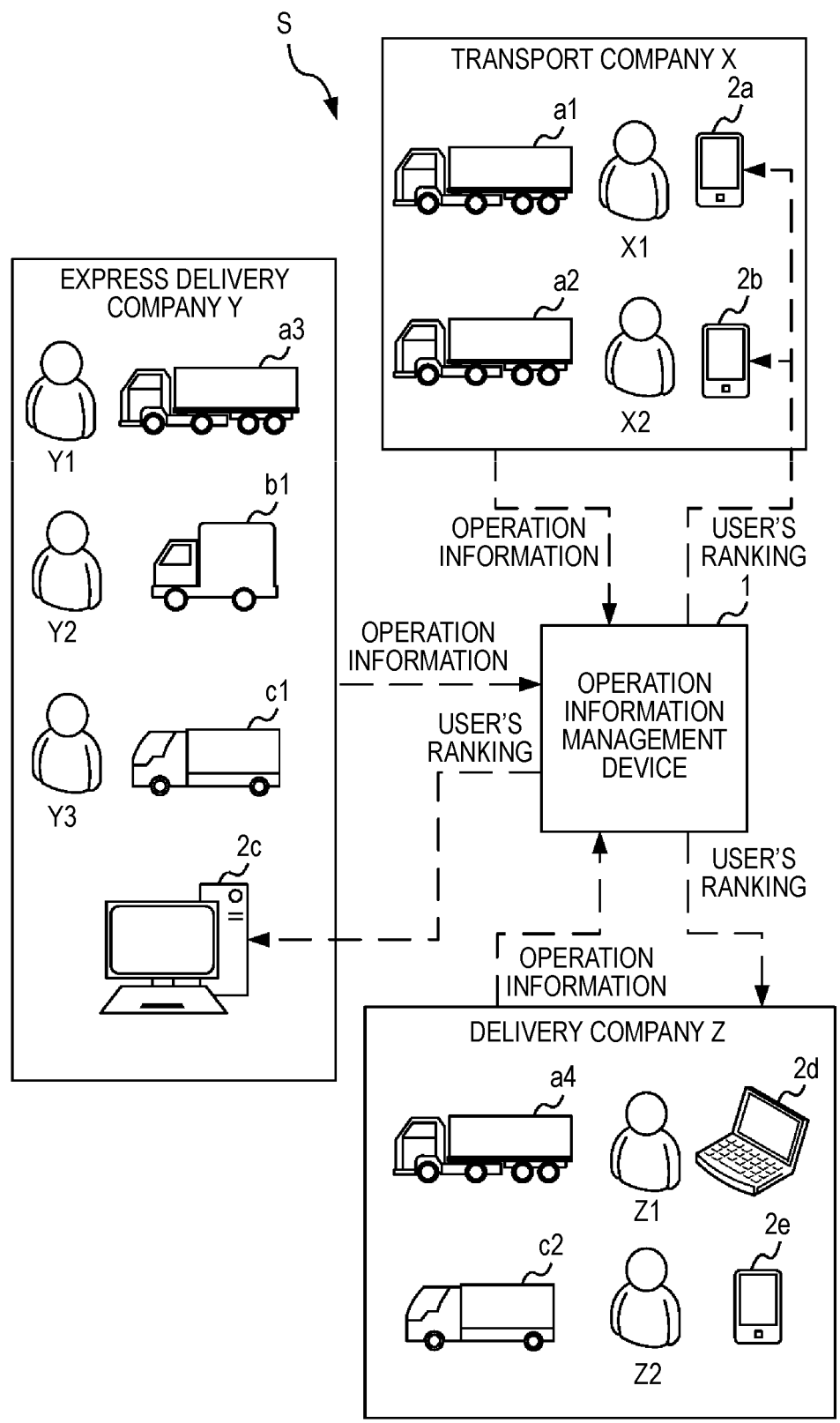
FIG. 1 is a view for explaining an outline of the disclosure.

FIG. 1 is a view for explaining an outline of the disclosure. An operation information management system S according to an embodiment includes one or more operation information recording devices for recording vehicle operation information, an operation information management device 1 for managing a plurality of operation information items, and user terminals 2. The following description will be made on the assumption that a business operator P who manages the operation information management device 1 is under contract with a plurality of transportation business operators (a transport company X, an express delivery company Y, and a delivery company Z). The business operator P provides operation information recording devices to the plurality of transportation business operators. The operation information recording devices are mounted on a plurality of vehicles belonging to the plurality of transportation business operators, respectively.

The operation information recording devices transmit the operation information of the vehicles equipped with the operation information recording devices, to the operation information management device 1. Specifically, if an operation information recording device mounted on a vehicle a1 receives an operation start instruction from a driver X1, it starts to record operation information. Thereafter, if receiving an operation end instruction from the driver X1, the operation information recording device stops recording operation information, and transmits the operation information recorded when the driver X1 had operated the vehicle a1, to the operation information management device 1.

Operation information of a vehicle is information representing operation contents. Information representing operation contents of a vehicle includes, for example, the running speed, the running time, the idling time, the ratio of the time when the vehicle has run in certain gear to the running time, the number of revolutions when upshifting has been performed, the way the brake has been used, the number of times and intensity of rapid acceleration, the magnitude of variation in running speed (uneven driving), whether the speed of the vehicle has exceeded the speed limit, the number of times and intensity of rapid deceleration, the intensity of rapid deceleration, whether the vehicle has been driven for a long time, and so on. However, the operation information is not limited thereto, and may further include identification information for identifying the vehicle, information representing the type of the vehicle, or information representing the condition of the vehicle.

The operation information management device 1 acquires the operation information items of each of the plurality of vehicles. When acquiring the operation information items, the operation information management device 1 makes evaluations of the drivers having operated the vehicles associated with the acquired operation information items. For example, based on an operation information item acquired from the operation information recording device mounted on the vehicle a1, the operation information management device 1 makes an evaluation of the driver X1 with respect to the driving contents.

The operation information management device 1 classifies the plurality of vehicles belonging to the contracted business operators into predetermined types (hereinafter, also referred to as segments), for example, according to the sizes of the vehicles, the operation patterns of the vehicles, and so on. For example, the operation information management device 1 classifies vehicles a1 and a2 of the transport company X, a vehicle a3 of the express delivery company Y, and a vehicle a4 of the delivery company Z which are large-sized vehicles for long-distance freight transport, into the same type (for example, a type "Large-Sized Vehicle for Long Distance"). Also, the operation information management device 1 classifies a vehicle b1 of the express delivery company Y which is a small-sized vehicle for short-distance delivery into a type (for example, a type "Small-Sized vehicle for Delivery") different from the type "Large-Sized Vehicle for Long Distance". Further, the operation information management device 1 classifies a vehicle c1 of the express delivery company Y and a vehicle c2 of the delivery company Z which are middle-sized vehicles for short-distance freight delivery, into the same type (for example, a type "Middle-Sized Vehicle for Intraregional Delivery").

With respect to each type of vehicles, the operation information management device 1 determines the rankings of drivers associated with the vehicles in the corresponding type based on the evaluations of the drivers. For example, with respect to the vehicle a1, the vehicle a2, the vehicle a3, and the vehicle a4 classified into the same type (the type "Large-Sized Vehicle for Long Distance"), the operation information management device 1 determines the rankings of the driver X1 associated with the vehicle a1, a driver X2 associated with the vehicle a2, a driver Y1 associated with the vehicle a3, and a driver Z1 associated with the vehicle a4.

Similarly, with respect to the vehicle c1 and the vehicle c2 classified into the same type (the type "Middle-Sized Vehicle for Intraregional Delivery"), the operation information management device 1 determines the rankings of a driver Y3 associated with the vehicle c1 and a driver Z2 associated with the vehicle c2. Similarly, with respect to the vehicle b1 classified into one type (the type "Small-Sized vehicle for Delivery"), the operation information management device 1 determines the ranking of a driver Y2 associated with the vehicle b1.

The operation information management device 1 transmits the determined rankings of the drivers to the user terminals 2. The user terminals 2 are, for example, computers which the drivers or the business operators employing the drivers use. For example, the operation information management device 1 transmits the ranking of the driver X1 in the type "Large-Sized Vehicle for Long Distance" to a user terminal 2a belonging to the driver X1. Alternatively, the operation information management device 1 may transmit the determined rankings of the drivers to user terminals 2 belonging to the business operators employing the drivers. For example, the operation information management device 1 transmits the ranking of the driver Y3 in the type "Small-Sized vehicle for Delivery" to a user terminal 2c belonging to the express delivery company Y employing the driver Y3.

As described above, the operation information management device 1 determines the rankings of drivers in each type. According to this configuration, each driver can see his or her own ranking in drivers who operate vehicles belonging to the same type. Therefore, the operation information management device 1 can encourage the drivers to improve their driving skills.

Also, the operation information management device 1 determines the driving grades of the drivers based on the evaluations of the drivers. For example, the operation information management device 1 determines the driving grade of the driver X1 based on the evaluation of the driver made based on a plurality of operation information items associated with the driver X1. The operation information management device 1 determines a grade improvement target value representing the difference between the current driving grade and a driving grade higher than the current driving grade. The operation information management device 1 transmits the current driving grade and the grade improvement target value to the user terminal 2a of the driver X1. Also, the operation information management device 1 may transmit the current driving grade and grade improvement target value of the driver X1 to the terminal of the business operator employing the driver.

According to this configuration, each driver can grasp his or her own driving skill level, and can see his or her grade improvement target value. Therefore, the operation information management device 1 can encourage the drivers to improve their driving skills.

<Functional Configuration of Operation Information Management Device 1>

Figure 2:
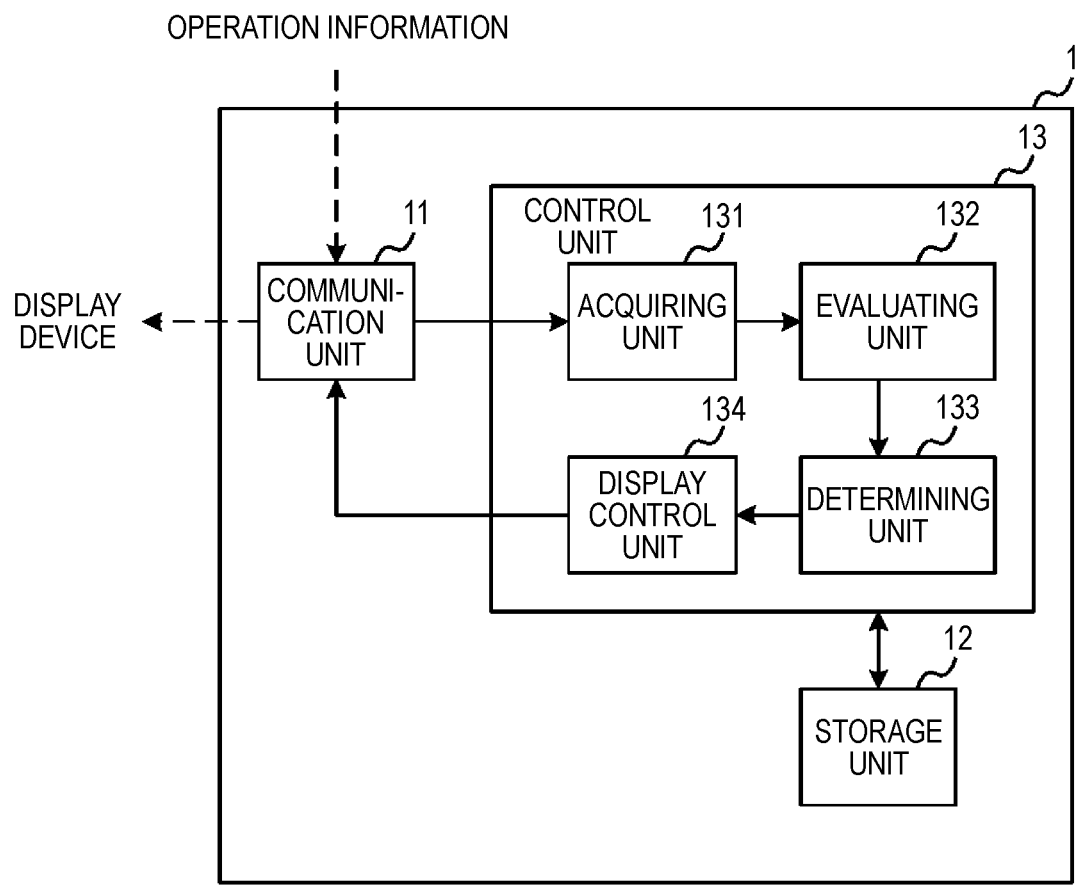
FIG. 2 is a view illustrating the functional configuration of an operation information management device according to an embodiment.

FIG. 2 is a view illustrating the functional configuration of the operation information management device 1 according to the embodiment. The operation information management device 1 includes a communication unit 11, a storage unit 12, and a control unit 13. The communication unit 11 is a communication module for performing communication with other devices via a communication line. The communication line is, for example, the Internet.

The storage unit 12 is, for example, a ROM (Read Only Memory) or a RAM (Random Access Memory). The storage unit 12 is for storing various programs for making the control unit 13 function. The control unit 13 is a computation resource including a processor such as a CPU (Central Processing Unit) (not shown in the drawings). The control unit 13 implements the functions of an acquiring unit 131, an evaluating unit 132, a determining unit 133, and a display control unit 134 by executing the programs stored in the storage unit 12.

The acquiring unit 131 acquires the operation information items of the plurality of vehicles via the communication unit 11. For example, in the case where the condition of a vehicle exceeds a driving-operation reference threshold to be described below, the acquiring unit 131 acquires operation information representing the amount by which the condition of the vehicle exceeds the driving-operation reference threshold, from a corresponding operation information recording device. The acquiring unit 131 notifies the acquired operation information to the evaluating unit 132.

Also, the acquiring unit 131 may acquire type setting instructions representing the types of the vehicles from the business operator P or the transportation business operators via the communication unit 11. Also, the acquiring unit 131 may notify the acquired type setting instructions to the determining unit 133.

The evaluating unit 132 makes evaluations of the drivers associated with the plurality of vehicles, based on the operation information items. For example, the evaluating unit 132 determines whether each operation information item is an evaluation subject, based on the running distance or the running time included in the corresponding operation information item, and in the case of determining that the corresponding operation information item is an evaluation subject, the evaluating unit 132 makes an evaluation of the corresponding driver. Specifically, in the case where an operation information item includes a running distance equal to or longer than a specific operation distance, or a running time equal to or longer than a specific operation time, the evaluating unit 132 determines that the corresponding operation information item is an evaluation subject. The specific operation distance or the specific operation time may be appropriately determined by the business operator managing the operation information management device 1. Alternatively, the business operators who are under contract with the business operator managing the operation information management device 1 may determine a specific operation distance or a specific operation time for each vehicle to be managed by the contracted business operator.

The evaluating unit 132 makes evaluations of the drivers, for example, based on the running conditions of the vehicles included in the operation information items. The running condition of a vehicle includes, for example, the speed of the vehicle, revolutions of the engine, the number of idle times or the idling time, the number of times and intensity of sudden unintended acceleration, and the number of times and intensity of rapid deceleration; however, it is not limited thereto. Specifically, the evaluating unit 132 scores the speed of each engine based on a result obtained by comparison with a predetermined driving-operation reference threshold, thereby making an evaluation of a corresponding driver. For example, in the case where the speed of a vehicle exceeds the driving-operation reference threshold, the evaluating unit 132 determines that it is an excess state, and determines the excess speed, or an evaluation value corresponding to the excess speed. With respect to the other content items, the evaluating unit 132 determines evaluations of the drivers by performing scoring in similar ways.

The evaluating unit 132 may determine a driving-operation reference threshold to be used as a threshold for determining driving-operation evaluation scores, based on the past operation information. For example, the evaluating unit 132 determines a driving-operation reference threshold based on operation information acquired before the latest operation information. In this case, the evaluating unit 132 transmits the driving-operation reference threshold to the operation information recording devices.

Based on the evaluations of one or more drivers associated with one or more vehicles of the plurality of vehicles classified into each type, the determining unit 133 determines the rankings of one or more drivers in the corresponding type. For example, in the case where the acquiring unit 131 has acquired a new operation information item, the determining unit 133 determines the rankings of one or more drivers in a vehicle type represented by the new operation information item. Hereinafter, the process of determining the rankings of drivers which is performed by the determining unit 133 will be described in detail. Based on the evaluations of drivers associated with the vehicles a1, a2, a3, and a4 classified into the same type "Large-Sized Vehicle for Long Distance", the determining unit 133 determines the rankings of the drivers in the same type "Large-Sized Vehicle for Long Distance". More specifically, the determining unit 133 determines the rankings of the plurality of drivers in descending order of the evaluations of the drivers.

For example, in the case where the evaluating unit 132 determines that an operation information item acquired by the acquiring unit 131 is an operation information item which is an evaluation subject, the determining unit 133 determines the rankings of drivers. According to this configuration, in the case where a vehicle has been operated exceptionally, the determining unit 133 does not determine the rankings of drivers. Therefore, the drivers can check their rankings based on normal operations.

The determining unit 133 may determine a vehicle type associated with an operation information item, based on the vehicle operation contents represented by the operation information item. For example, the determining unit 133 determines a vehicle type associated with an operation information item, based on the running distance included in the operation information item. Specifically, the determining unit 133 determines the type of a vehicle according to the sum of the running distances included in a plurality of operation information items of the vehicle acquired during a certain period. For example, in the case where the sum is equal to or longer than a predetermined total distance, the determining unit 133 determines a type "Vehicle for Long Distance" as the type of the vehicle. Meanwhile, in the case where the sum of the running distances included in the plurality of operation information items of the g vehicle acquired during the certain period is shorter than the predetermined total distance, the determining unit determines a type "Vehicle for Short Distance" as the type of the vehicle.

Also, the determining unit 133 may determine a vehicle type associated with an operation information item, based on the running time and the vehicle speed included in the operation information item. For example, in the case where a time for which the vehicle speed has been equal to or higher than a certain high running speed is equal to or longer than a certain high-speed running time, the determining unit 133 determines a type "Vehicle for Express Transport" as the type of the vehicle. The high running speed is, for example, a legal minimum speed for highways, specifically, 50 km/h; however, it may be appropriately set by the business operator managing the operation information management device 1. Also, the high-speed running time may be appropriately set by the business operator managing the operation information management device 1. Alternatively, the business operators who are under contract with the business operator managing the operation information management device 1 may appropriately set a high-speed running time for each vehicle to be managed by the contracted business operator. Also, based on an operation time which is included in an operation information item and represents a time for which a corresponding vehicle has been operated, a high-speed running time may be determined.

The determining unit 133 may determine the type of a vehicle based on a structure mounted on the vehicle. For example, if the weight of a structure mounted on a vehicle is changed, the determining unit 133 determines a type according to the weight of the mounted structure, as the type of the vehicle. For example, in the case where a structure mounted on a vehicle is changed to another structure, the determining unit 133 determines a type according to the weight of the changed structure as the type of the vehicle.

In the case where the acquiring unit 131 has acquired a type setting instruction, the determining unit 133 may determine a vehicle type based on the type setting instruction. For example, if the type setting instruction represents a vehicle type "Vehicle for Long Distance", the determining unit 133 determines the type "Vehicle for Long Distance" as the type of a corresponding vehicle. According to this configuration, for example, in the case where an operation information recording device mounted on a vehicle of the type "Vehicle for Short Distance" is detached from the vehicle, and is attached to another vehicle which needs to be classified into the type "Vehicle for Long Distance", the determining unit 133 can determine an appropriate vehicle type. Also, in the case where a structure mounted on a vehicle is changed to another structure, the business operator P or a corresponding transportation business operator can set a type appropriate for the changed structure.

The determining unit 133 determines the driving grades of the drivers, for example, based on the evaluations of the drivers. Specifically, the determining unit 133 determines the driving grade of each driver based on an evaluation of the corresponding driver made based on a plurality of operation information items associated with the corresponding driver. More specifically, the determining unit 133 determines the driving grade of a driver according to the sum of a plurality of evaluations of the corresponding driver which the evaluating unit 132 made based on a plurality of operation information items acquired for a certain grade evaluation period. The certain grade evaluation period is a period required to evaluate the driving skill of a driver, and is, for example, one month; however, the business operators who are under contract with the business operator managing the operation information management device 1 may appropriately determine a grade evaluation period.

The determining unit 133 may determine the driving grades of the drivers at a time interval longer than a time interval at which the determining unit determines the rankings of the drivers. For example, in a case where the acquiring unit 131 acquires a new operation information item, the determining unit 133 determines the rankings of drivers associated with the acquired operation information item, and in a case where the acquiring unit 131 acquires operation information items associated with one driver for a plurality of times, the determining unit determines the driving grades of corresponding drivers. Also, after determining the driving grades of the drivers, the determining unit 133 determines a grade improvement target value for each driver representing the difference between the current driving grade of the corresponding driver and a driving grade upper than the current driving grade.

If the determining unit 133 determines the rankings of one or more drivers, the display control unit 134 controls display units of corresponding user terminals 2 via the communication unit 11, such that the display units display the rankings. Also, the display control unit 134 may control user terminals 2 such that the user terminals display the driving grades or grade improvement target values of drivers determined by the determining unit 133. According to this configuration, each driver who operates a vehicle can compare his or her own ranking with the rankings of the other drivers classified into the same type. Therefore, the operation information management device 1 can encourage the drivers to improve their driving skills.

Also, the business operators employing the drivers can check the rankings of the employed drivers, and thus can give the drivers guidance in improving their driving skills. Also, each business operator can compare each driver employed by his or her company with a plurality of drivers of the other companies classified into the same type, and thus can set an improvement goal in view of the levels of the drivers of the other companies.

Figure 3:
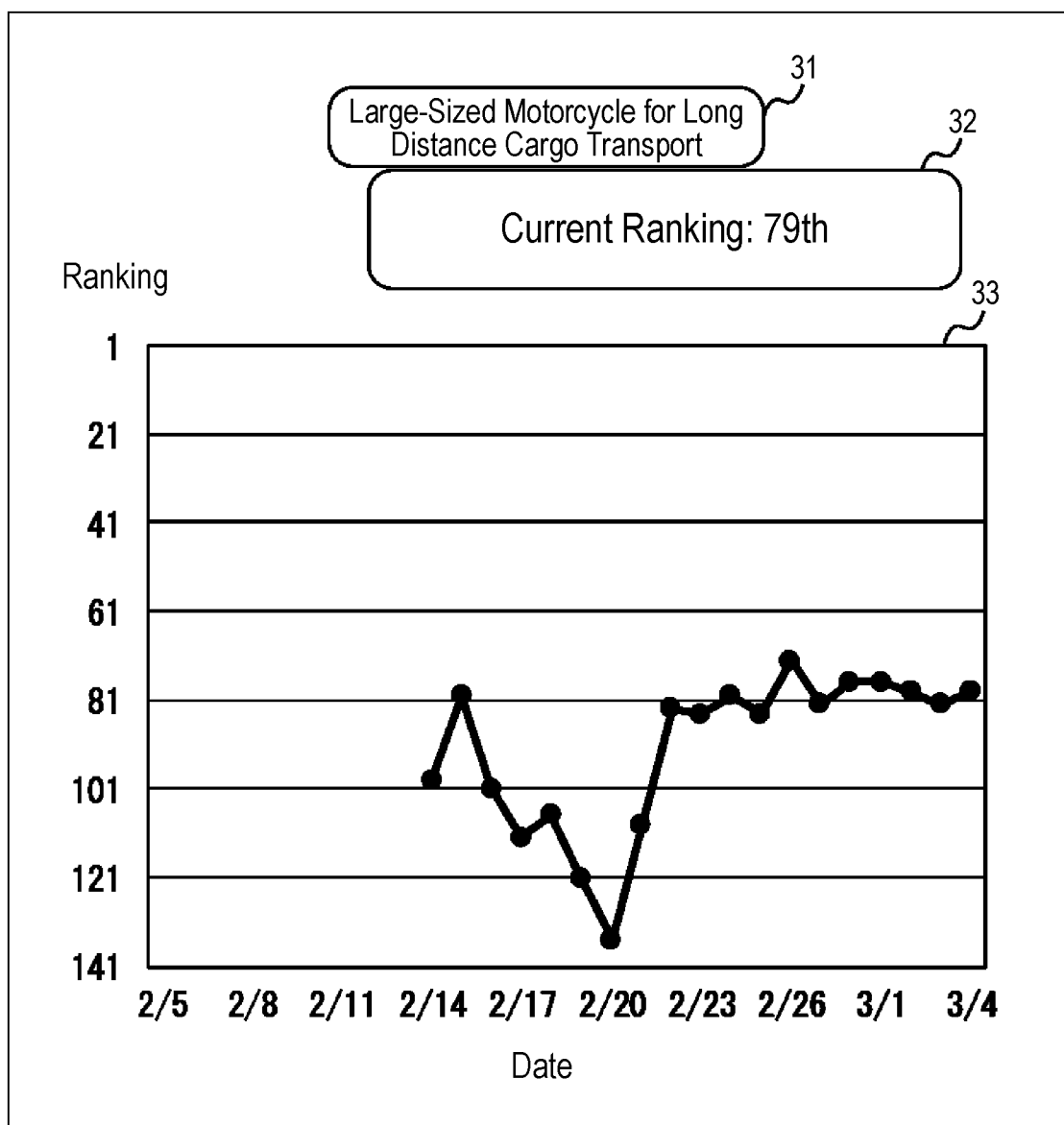
FIG. 3 is a view schematically illustrating a display screen showing the ranking of a user.

FIG. 3 is a view schematically illustrating a display screen displaying the ranking of a driver. A section 31 is a part displaying a vehicle type. The display control unit 134 performs control such that in the section 31, a vehicle type "Large-Sized Motorcycle for Long Distance Cargo Transport" is displayed. A section 32 displays the ranking of the driver in the type. The display control unit 134 performs control such that in the section 32, information representing that the ranking of the driver in the vehicle type "Large-Sized Motorcycle for Long Distance Cargo Transport" is 79th. A section 33 displays a graph having a horizontal axis and a vertical axis representing dates and rankings, respectively. The display control unit 134 performs control such that in the section 33, variation in the ranking of the driver with time is displayed.

As described above, the display control unit 134 performs control such that the ranking of each driver is displayed on a display unit. As a result, each driver can see his or her own ranking in driving. Therefore, it is possible to encourage the drivers to improve their driving skills. Also, each business operator who is under contract with the business operator managing the operation information management device 1 can see the rankings of drivers including drivers of the other companies, and can check whether his or her company has room for improvement.

Figure 4:
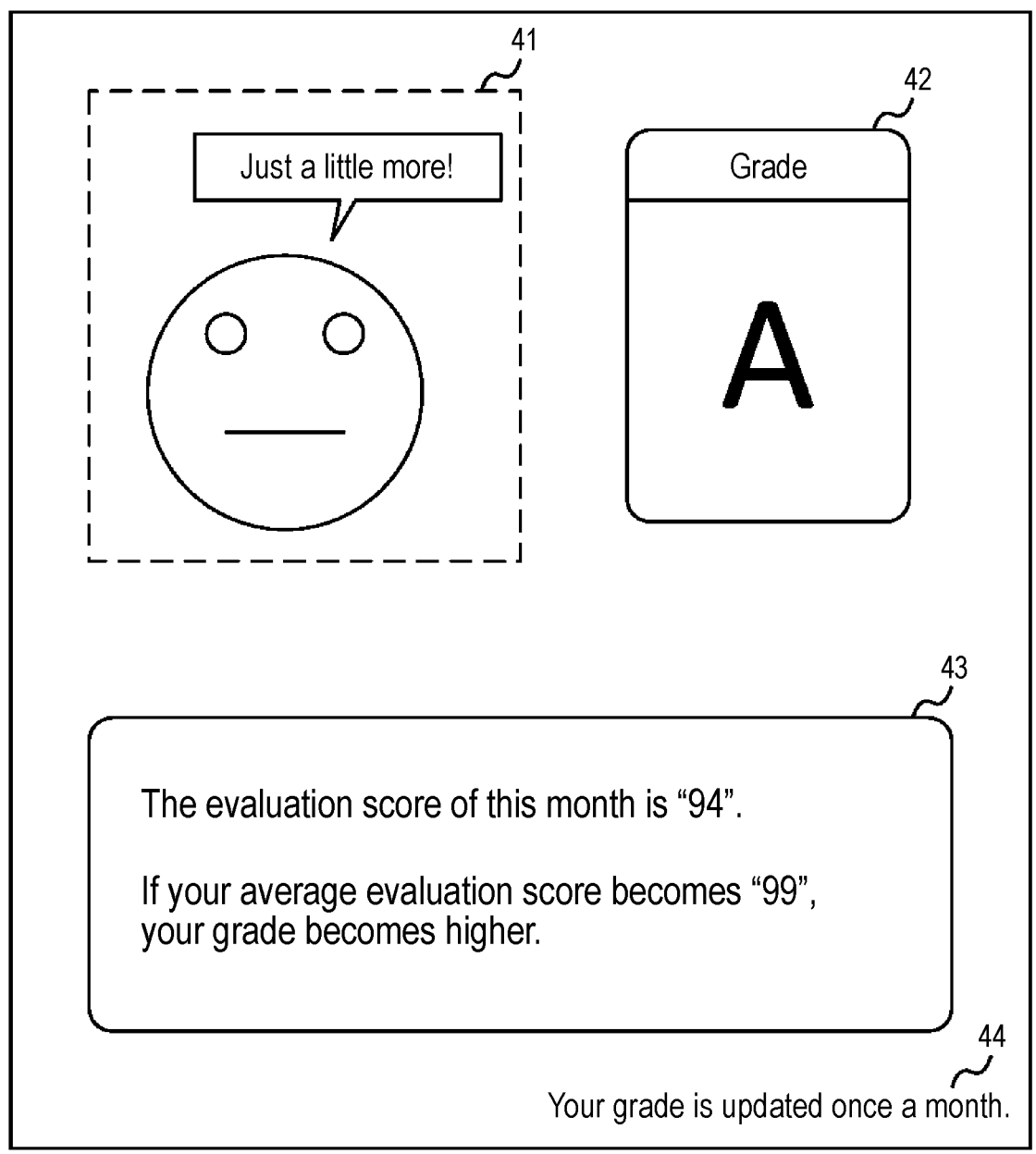
FIG. 4 is a view schematically illustrating a display screen showing the grade of the user.

The display control unit 134 may perform control such that the display units display the driving grades of the drivers determined by the determining unit 133. FIG. 4 is a view schematically illustrating a display screen displaying the grade of a driver. A section 41 is a part for displaying an icon representing the difference from a score required for a grade immediately above the grade of the driver. The display control unit 134 performs control such that as the difference from the score required for the grade immediately above the grade of the driver decreases, an icon which looks more genial is displayed. The display control unit 134 performs control such that as the difference from the score required for the grade immediately above the grade of the driver increases, an icon which looks more serious is displayed.

A section 42 is a part for displaying the current driving grade of the driver. The display control unit 134 performs control such that in the section 42, "A" is displayed as the current driving grade of the driver. A section 43 is a part for displaying the current evaluation score of the driver, and an evaluation score required for a grade immediately above the current driving grade. The display control unit 134 performs control such that in the section 43, information representing that the current evaluation score of the driver is "94" and the evaluation score required for the grade immediately above the current driving grade is "99" is displayed. A section 44 is a part for displaying the update frequency for the driving grade. The display control unit 134 performs control such that in the section 44, information representing that the driving grade is updated once a month is displayed. As described above, the display control unit 134 controls the display units such that the display units display the grades of the drivers. Therefore, the drivers can see their driving grades. Therefore, it is possible to encourage the drivers to improve their driving skills.

Figure 5:
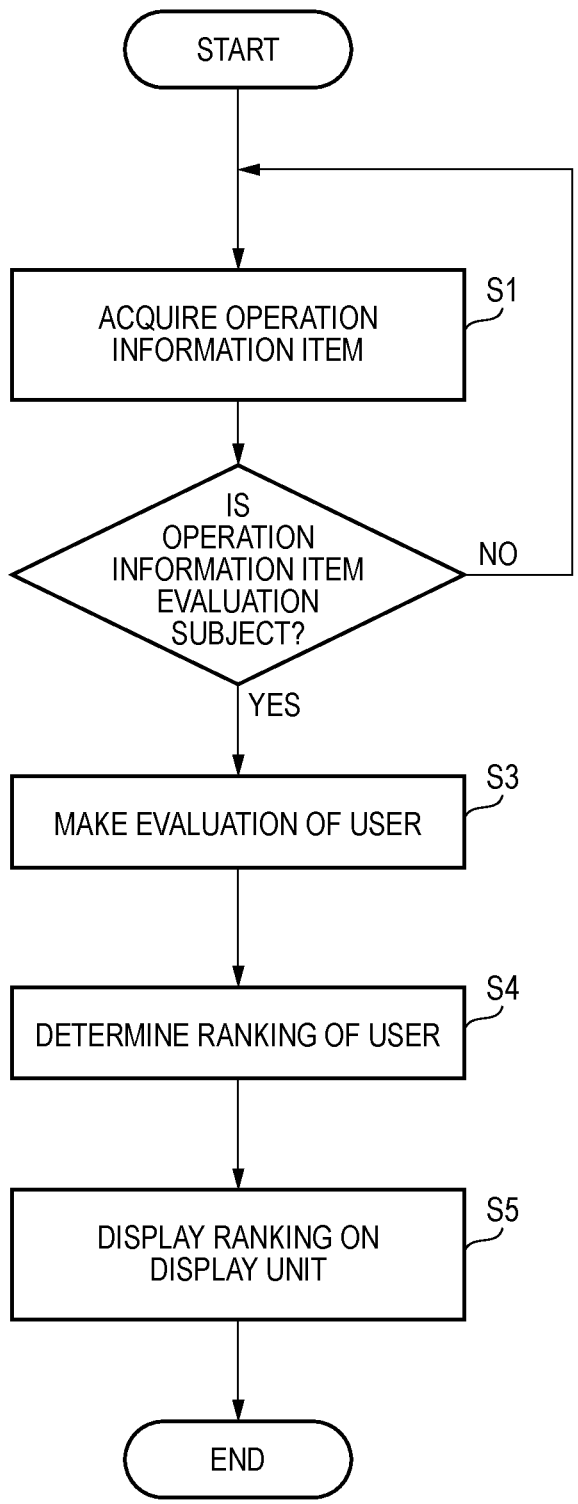
FIG. 5 is a flow chart illustrating a process of determining the ranking of the user.

FIG. 5 is a flow chart illustrating the process of determining the ranking of a driver. Hereinafter, the flow of the process of determining the ranking of a driver will be described with reference to FIG. 5. First, the acquiring unit 131 acquires the operation information item of a corresponding vehicle (STEP S1). The evaluating unit 132 determines whether the operation information item acquired by the acquiring unit 131 is an evaluation subject (STEP S2).

If determining that the operation information item acquired by the acquiring unit 131 is not an evaluation subject ("No" in STEP S2), the evaluating unit 132 waits for the acquiring unit 131 to acquire an operation information item which is an evaluation subject. If determining that the operation information item acquired by the acquiring unit 131 is an evaluation subject ("Yes" in STEP S2), the evaluating unit 132 makes an evaluation of the driver based on the operation information item (STEP S3). The determining unit 133 determines the ranking of the driver based on the evaluation of the driver (STEP S4). The display control unit 134 performs control such that the ranking of the driver is displayed, for example, on a display unit of a terminal of a business operator employing the driver (STEP S5).

[Effects of Operation Information Management Device 1 According to Embodiment]

As described above, the determining unit 133 of the operation information management device 1 makes evaluations of the drivers based on operation information items, and determines the rankings of one or more drivers in each type based on the evaluations of the drivers. According to this configuration, the drivers who operate the vehicles can see their driving skill levels. Therefore, it is possible to encourage the drivers to improve their driving skills. Also, operation managers who supervise the drivers employed by the transportation business operators can give the drivers guidance based on the evaluations of the drivers. Therefore, the operation information management device 1 can reduce the tasks of the operation managers to give the drivers guidance in driving.

Also, in the case where the acquiring unit 131 has acquired a new operation information item, the determining unit 133 determines the rankings of drivers. Therefore, even though the ranking is low, the driver can raise his or her own ranking in a short time. Therefore, the operation information management device 1 can suppress a drop in the ranking of a driver from discouraging the driver from improving his or her driving skill.

Although the disclosure has been described above using the embodiment, the technical scope of the disclosure is not limited to the scope of the above-described embodiment. It should be apparent to those skilled in the art that various changes or improvements can be made to the above-described embodiment. It is apparent from the description of the appended claims that implementations including such changes or improvements are encompassed in the technical scope of the disclosure.

The present invention provides illustrative, non-limiting examples as follows:

According to a first aspect of the disclosure, there is provided an operation information management device including: an acquiring unit configured to acquire operation information items of each of a plurality of vehicles; an evaluating unit configured to make evaluations of drivers respectively associated with each of the plurality of vehicles, the evaluations being made based on the operation information items; a determining unit configured to determine a ranking of one or more of the drivers associated with each of one or more vehicles of the plurality of vehicles which are classified into the same type of vehicle, the determining of the ranking being performed based on the evaluations of the one or more drivers; and a display control unit configured to control a display unit such that the display unit displays the ranking of the one or more drivers determined by the determining unit.

According to a second aspect of the disclosure, there is provided the operation information management device according to the first aspect, wherein, in a case where the acquiring unit acquires a new operation information item, the determining unit determines a ranking of one or more drivers associated with each of one or more vehicles of the plurality of vehicles which are classified into a vehicle type represented by the new operation information item.

According to a third aspect of the disclosure, there is provided the operation information management device according to the first aspect, wherein the evaluating unit is configured to determine whether the operation information item is an evaluation subject based on a running distance or a running time included in the operation information item, and makes evaluations of the drivers in a case where it is determined that the operation information item is an evaluation subject.

According to a fourth aspect of the disclosure, there is provided the operation information management device according to the first aspect, wherein the determining unit is configured to determine a type of the vehicle associated with the operation information item based on a running distance included in the operation information item.

According to a fifth aspect of the disclosure, there is provided the operation information management device according to the first aspect, wherein the determining unit is configure to determine a type of the vehicle based on a structure mounted on the vehicle.

According to a sixth aspect of the disclosure, there is provided the operation information management device according to the first aspect, wherein the acquiring unit is configured to acquire a type setting instruction representing a type of the vehicle, and wherein the determining unit is configured to determine the type of the vehicle based on the type setting instruction.

According to a seventh aspect of the disclosure, there is provided the operation information management device according to the first aspect, wherein the determining unit is configured to determine a driving grade of the driver at a time interval longer than a time interval at which the determining unit determines the ranking.

According to an eighth aspect of the disclosure, there is provided an operation information management method for a computer, the method including: acquiring operation information items of each of a plurality of vehicles; making evaluations of drivers respectively associated with each of the plurality of vehicles, the evaluations being made based on the operation information items; determining a ranking of one or more of the drivers associated with each of one or more vehicles of the plurality of vehicles which are classified into the same type of vehicle, the determining of the ranking being performed based on the evaluations of the one or more drivers; and controlling a display unit such that the display unit displays the ranking of the one or more drivers.

According to a ninth aspect of the disclosure, there is provided an operation information management system including: one or more operation information recording devices configured to record an operation information item of a vehicle; an operation information management device configured to manage a plurality of operation information items of a plurality of vehicles; and a user terminal, wherein the one or more operation information recording devices include: a recording unit configured to record the operation information item of the vehicle equipped with the operation information recording device; and a transmitting unit configured to transmit the recorded operation information item to the operation information management device, wherein the operation information management device includes: an acquiring unit configured to acquire the plurality of operation information items of the plurality of vehicles; an evaluating unit configured to make evaluations of drivers respectively associated with each of the plurality of vehicles, the evaluations being made based on the operation information items; a determining unit configured to determine a ranking of one or more of the drivers associated with each of one or more vehicles of the plurality of vehicles which are classified into the same type of vehicle, the determining of the ranking being performed based on the evaluations of the one or more drivers; and a transmitting unit configured to transmit the ranking of the one or more drivers determined by the determining unit to the user terminal, and wherein the user terminal includes: a receiving unit configured to receive the ranking of the drivers; and a display unit configured to display the received ranking of the drivers.

What is claimed is:

1. An operation information management device comprising:
    an acquiring unit configured to acquire operation information of each of a plurality of vehicles;
    an evaluating unit configured to make evaluations of drivers respectively associated with each of the plurality of vehicles, the evaluations being made based on the operation information;
    a determining unit configured to determine a ranking of one or more of the drivers associated with each of one or more vehicles of the plurality of vehicles which are classified into a same type of vehicle, the determining of the ranking being performed based on the evaluations of the one or more drivers, wherein the determining unit is configured to determine a type of the vehicle associated with the operation information based on a running distance included in the operation information; and
    a display control unit configured to control a display unit such that the display unit displays the ranking of the one or more drivers determined by the determining unit.

2. The operation information management device according to claim 1,
    wherein, in a case where the acquiring unit acquires new operation information, the determining unit determines a ranking of one or more drivers associated with each of one or more vehicles of the plurality of vehicles which are classified into a vehicle type represented by the new operation information.

3. The operation information management device according to claim 1,
    wherein the evaluating unit is configured to determine whether the operation information is an evaluation subject based on a running distance or a running time included in the operation information, and makes evaluations of the drivers in a case where it is determined that the operation information is an evaluation subject.

4. The operation information management device according to claim 1,
    wherein the determining unit is configure to determine a type of the vehicle based on a structure mounted on the vehicle.

5. The operation information management device according to claim 1,
    wherein the acquiring unit is configured to acquire a type setting instruction representing a type of the vehicle, and
    wherein the determining unit is configured to determine the type of the vehicle based on the type setting instruction.

6. The operation information management device according to claim 1,
    wherein the determining unit is configured to determine a driving grade of the driver at a time interval longer than a time interval at which the determining unit determines the ranking.

7. An operation information management method for a computer, the method comprising:
    acquiring operation information of each of a plurality of vehicles;

making evaluations of drivers respectively associated with each of the plurality of vehicles, the evaluations being made based on the operation information;

determining a ranking of one or more of the drivers associated with each of one or more vehicles of the plurality of vehicles which are classified into a same type of vehicle, the determining of the ranking being performed based on the evaluations of the one or more drivers, wherein the determining includes determining a type of the vehicle associated with the operation information based on a running distance included in the operation information; and controlling a display unit such that the display unit displays the ranking of the one or more drivers.

8. An operation information management system comprising:

one or more operation information recording devices configured to record operation information of a vehicle;

an operation information management device configured to manage a plurality of operation information of a plurality of vehicles; and a user terminal, wherein the one or more operation information recording devices include:

a recording unit configured to record the operation information of the vehicle equipped with the operation information recording device; and a transmitting unit configured to transmit the recorded operation information to the operation information management device, wherein the operation information management device includes:

an acquiring unit configured to acquire the plurality of operation information of the plurality of vehicles;

an evaluating unit configured to make evaluations of drivers respectively associated with each of the plurality of vehicles, the evaluations being made based on the operation information;

a determining unit configured to determine a ranking of one or more of the drivers associated with each of one or more vehicles of the plurality of vehicles which are classified into a same type of vehicle, the determining of the ranking being performed based on the evaluations of the one or more drivers, wherein the determining unit is configured to determine a type of the vehicle associated with the operation information based on a running distance included in the operation information; and a transmitting unit configured to transmit the ranking of the one or more drivers determined by the determining unit to the user terminal, and wherein the user terminal includes:

a receiving unit configured to receive the ranking of the drivers; and a display unit configured to display the received ranking of the drivers.

9. The operation information management device according to claim 1, wherein the display control unit is configured to control the display unit such that the display unit simultaneously displays the type of vehicle, the ranking of the drivers, and a variation in the ranking of the driver with time.

10. The operation information management device according to claim 1, wherein the determining unit is configured to determine the type of the vehicle associated with the operation information based on a running time and a vehicle speed included in the operation information.

11. The operation information management device according to claim 1, wherein the operation information includes one or more of operation information items.

12. The operation information management method of claim 7, wherein the operation information includes one or more of operation information items.

13. The operation information management system of claim 8, wherein the operation information includes one or more of operation information items.

* * * * *